United States Patent [19]

Fukuda et al.

[11] 4,311,953
[45] Jan. 19, 1982

[54] CHARGER USING ONE OR MORE SOLAR BATTERIES

[75] Inventors: Hiroaki Fukuda, Nara; Takehiko Sasaki, Yamatokoriyama; Hiroshi Mori, Tenri, all of Japan

[73] Assignee: Sharp Kabushiki Kaisha, Osaka, Japan

[21] Appl. No.: 86,793

[22] Filed: Oct. 22, 1979

Related U.S. Application Data

[63] Continuation of Ser. No. 825,478, Aug. 17, 1977.

[30] Foreign Application Priority Data

Aug. 17, 1976 [JP] Japan .................................. 51-98422
Jul. 22, 1977 [JP] Japan .................................. 52-88612

[51] Int. Cl.³ .......................... H02J 7/00; G04C 3/00
[52] U.S. Cl. ........................................ 320/2; 320/40; 320/57; 323/906; 368/205

[58] Field of Search ........................................ 320/2-5, 320/15, 39, 61, 40, 22-24, 57; 323/15; 368/204, 205

[56] References Cited

U.S. PATENT DOCUMENTS

| | | | |
|---|---|---|---|
| 3,312,889 | 4/1967 | Gold | 320/40 X |
| 3,402,339 | 9/1968 | Abrams | 320/40 |
| 3,426,263 | 2/1969 | Hennigan et al. | 320/23 |
| 3,921,049 | 11/1975 | Mellors et al. | 320/2 |
| 3,979,656 | 9/1976 | Takeda et al. | 320/2 |

*Primary Examiner*—Robert J. Hickey
*Attorney, Agent, or Firm*—Birch, Stewart, Kolasch and Birch

[57] ABSTRACT

A charger, which is useful to power a variety of compact type electronic appliances such as an electronic wristwatch, includes one or more solar batteries as a primary battery, and a sealed type silver oxide battery as a secondary battery. Both the amount of charging current amplitude and of charging voltage are limited to protect the sealed silver oxide battery from its own expanse phenomenon.

11 Claims, 8 Drawing Figures

CHARGER USING ONE OR MORE SOLAR BATTERIES

This application is a continuation of copending application Ser. No. 825,478, filed on Aug. 17, 1977.

BACKGROUND OF THE INVENTION

The present invention relates to a charger using one or more solar batteries and useful for small-size apparatus such as an electronic wristwatch.

It is well known that a nickel-cadmium (Ni-Cd) battery can be used as a power source for electronic wristwatches in combination with one or more solar batteries (SB). However, the Ni-Cd battery is not preferable because cubic efficiency of battery capacity is poor and the amount of self discharging is large. For instance, when the Ni-Cd battery has a diameter of 11.6 mm and a height of 5.1 mm, the battery capacity is about 20 mAH and the self discharging amounts to nearly 30% for 90 days. In contrast, a sealed type silver oxide battery, which consists of a positive electrode made of Ag, AgO or $Ag_2O$ and a negative electrode made of Zn or Cd, has excellent properties with respect to cubic efficiency, the self discharging, etc. For instance, in the case of a silver oxide battery of substantially the same size as the above, that is, a diameter of 11.56 mm and a height of 5.33 mm, the battery capacity is about 190 mAH and the amount of self discharging is about 10% per year when the electrolyte is NaOH and about 20% per year when the same is KOH. Moreover, the silver oxide battery shows charging efficiency up to about 90% while the Ni-Cd battery has a charging efficiency of only about 70%. Nonetheless, in the event that the silver oxide battery maintains its charge after full charging, the battery will swell out and the output voltage of the battery will swing. The former is deemed to occur due to the fact that gas is generated within the battery by the over-charging. The latter is deemed to occur because Ag oxide is dissolved into an alkali electrolyte and then shifted into the Zn negative electrode or Zn is deposited in a dendrite or spongy fashion to cause short circuiting.

Even in the prior art Ni-Cd battery, the battery might swell out by gas accumulation within the battery when more than 0.1 CA charging current flows under the full charged condition. To this end, a current limiting resistor or the like is usually connected to suppress the charging current in the order of less than 0.1 CA. However, unlike the Ni-Cd battery, the above-mentioned silver oxide battery will result in expansion of the battery or swinging of the output voltage even when the charging current is limited. A sealed type mercury battery consisting of a positive electrode made of Hg, HgO or $Hg_2O$ and a negative electrode made of Zn or Cd, must undergo the same circumstances.

Therefore, it is an object of the present invention to provide a charger which overcomes the above-mentioned disadvantages. According to the present invention, a charging current limiting means and a charging voltage limiting means are provided simultaneously in a charger unit including one or more solar batteries and a secondary battery such as a silver oxide battery. In one preferred form, the charging current limiting means and the charging voltage limiting means are enabled only when the solar batteries deliver the output voltage.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiment taken in connection with the accompanying drawings, wherein:

DETAILED DESCRIPTION OF THE INVENTION

Although the present invention is equally applicable to the silver oxide battery, the mercury battery or the like, details of the present invention will be set forth by way of example of the silver oxide battery.

Figure 1:
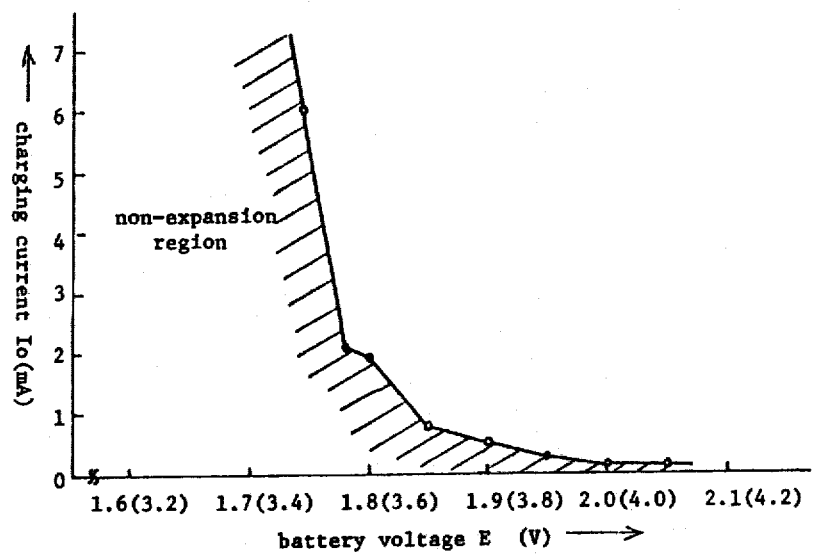
FIG. 1 is a characteristic chart showing relationship between permissible battery voltage and charging current of a silver oxide battery.

FIG. 1 illustrates a battery voltage vs. charging current characteristic of the sealed type silver oxide battery with the numbers on the abscissa indicating the battery voltage E(V) and the numbers on the ordinate indicating the charging current $I_o(m^4)$. The battery will be operable well without any expansion or circuit-shorting provided that neither the battery voltage nor the charging current extends beyond a range surrounded by the slant lines. It is obvious from FIG. 1 that the battery voltage E keeps increasing with the development of charging and, if the charging current exceeds such permissible range, then the battery will swell out and short-circuiting will occur. In other words, it is not possible to overcome the swelling out and the short-circuiting of the battery even if the charging current is limited as was typical with the prior art Ni-Cd battery, because of further increasing of the battery voltage E. To solve this problem, it is required that the charging current be suppressed with respect to the battery voltage and therefore not only the charging current but also the battery voltage will be suppressed within the permissible range. Since the battery voltage never increases above the charging voltage, a limitation on the charging voltage means equally a limitation on the battery voltage.

Figure 2:
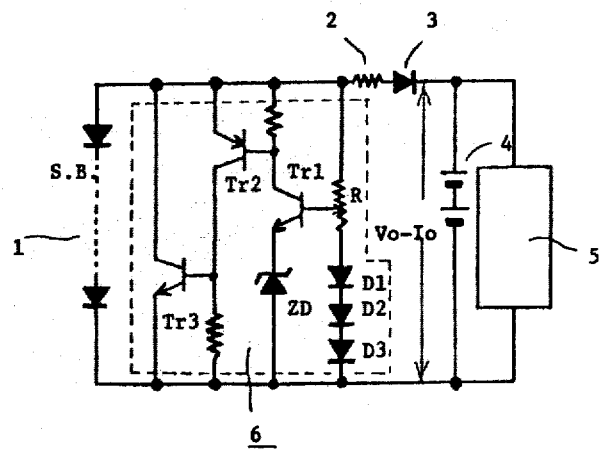
FIG. 2 is a circuit diagram showing one preferred form of the present invention.

FIG. 2 is a circuit diagram of a charging unit of a solar battery powered electronic wristwatch, wherein the charging current and the charging voltage are both properly limited. Reference 1 represents solar batteries, reference 2 represents a current limiting resistor, reference 3 represents a reverse current preventing diode, reference 4 represents the silver oxide batteries set forth above, and 5 represents a timekeeping circuit. In front of the current limiting resistor 2 and the reverse current preventing diode 3 a voltage switching circuit 6 is provided in parallel with the solar batteries 1. The circuit further comprises a voltage detecting transistor $Tr_1$, switching characteristic improving transistors $Tr_2$ and $Tr_3$, a constant voltage element Z such as a Zener diode available for shifting the operating point of the transistor $Tr_1$ upward and improving a temperature characteristic of the voltage switching circuit 6, a variable resistor R available for adjusting a bias voltage for the transistor $Tr_1$, and temperature compensating diodes $D_1$-$D_3$ available for accommodating temperature-depending variations in the permissible range of the battery voltage vs. charging current characteristic.

Figure 3:
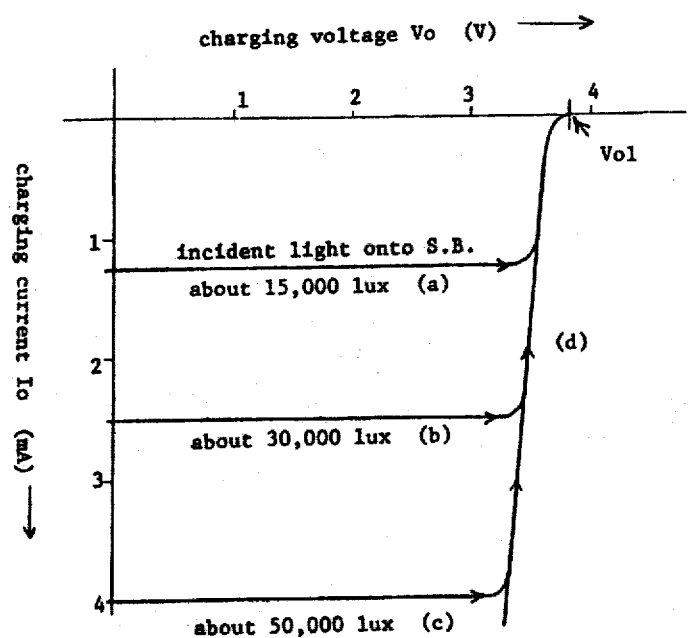
FIG. 3 is a characteristic chart showing relationship between charging voltage and charging current.

A voltage (Vo) vs. current (Io) characteristic of the charging unit of FIG. 2 is illustrated in FIG. 3. The silver oxide battery will be charged in proportion to the intensity of incident light onto the solar batteries; the curve (a) showing a process of charging under 15,000 lux, the curve (b) under 30,000 lux and the curve (c) under 50,000 lux. However, it is understood that the charging process is restricted as shown by the curve (d) upon arrival of the full charged condition. The curve (d) is determined mainly by the current limiting resistor 2, the reverse current preventing diode 3, and the voltage switching circuit 6. The leading voltage $Vo_1$ on the curve (d) is equal to a voltage turning on the voltage switching circuit 6 and the transistors $Tr_1$, $Tr_2$ and $Tr_3$ minus the forward voltage of the reverse current preventing diode 3 and the incline of the curve (d) is determined by the resistance value of the current limiting resistor 2. FIG. 3 is plotted with 12 serially connected solar batteries each having a working area of 40 mm$^2$. If a pair of the silver oxide batteries having substantially the same capacity is serially connected, the battery voltage vs. charging current characteristic assumes the same battery voltage as indicated within the parentheses of FIG. 1. Therefore, the voltage-current characteristic of FIG. 3 is settled within the slant line marked range shown by FIG. 1 to prevent swelling and short-circuiting of the batteries.

Figure 4:
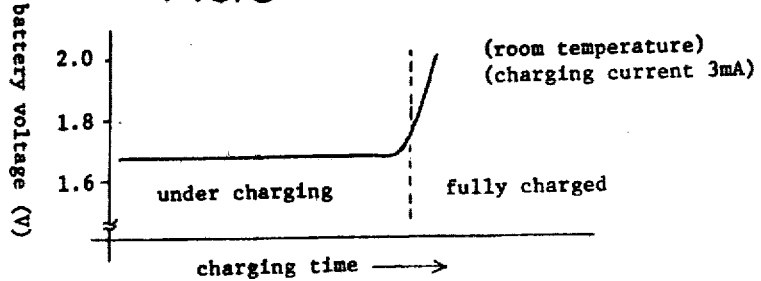
FIG. 4 is a characteristic chart showing a charging property of the silver oxide battery.

FIG. 4 illustrates a charging characteristic of the silver oxide battery at room temperature with the charging current of 3 mA indicating that charging can be accomplished with the charging voltage of 1.65 V. In the case where the two silver oxide batteries are serially connected, the charging current will flow sufficiently with $1.65 \times 2 = 3.30$ (V) as is clear from FIG. 3 so that the utilization of the circuit of FIG. 2 will not disturb the charging process. If there is any difference in the material which constitutes the silver oxide battery or in the characteristics of the serially connected plurality of silver oxide batteries, the battery voltage charging current characteristic will vary. In this instance, the variable resistor R is adjusted to change the on voltage of the voltage switching circuit 6. Alternatively, the resistance value of the current limiting resistor 2 may be varied.

Figures 5, 6:
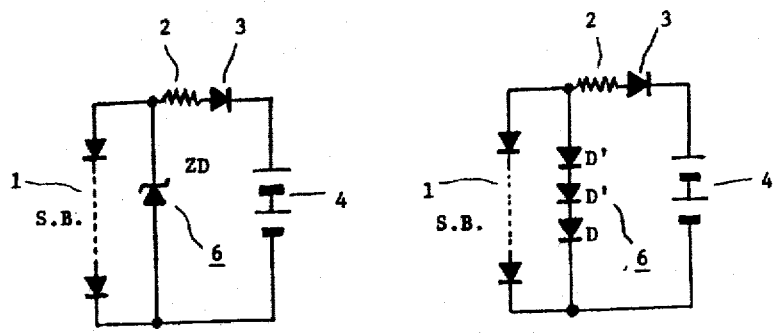
FIG. 5 is a circuit diagram showing another embodiment of the present invention.
FIG. 6 is a circuit diagram showing still another embodiment of the present invention.

FIGS. 5 and 6 show other embodiments wherein the voltage switching circuit 6 consists of a Zener diode ZD in case of FIG. 5 and consists of a series circuit of two GaP light emitting diodes D'0 and a Si diode D. The former utilizes the avalanche effect of the Zener diode ZD while the latter utilizes the forward voltage addition effects of the diodes. Although the Zener diodes manifest variations in the characteristics and particularly poor trailing properties, they can be overcome by combinations with Si diodes or light emitting diodes of GaP, GaAlAs, GaAs, etc.

Meanwhile, since the voltage switching circuit 6 is connected in front of the reverse current preventing diode 3, current never flows from the silver oxide batteries through the voltage switching circuit. In other words, the voltage switching circuit 6 operates only when incident light is applied to the solar batteries 1.

In case where the two silver oxide batteries are serially connected as stated above, the charging voltage is nearly 3.30 V for example. Assume now that current consumption by the voltage switching circuit 6 mainly the variable resistor R and the diodes $D_1$-$D_3$ is 10 $\mu A$. When the solar batteries 1 are exposed to incident light for one (1) hour per day, the current consumption amounts to 10 $\mu A$ hour/day. However, considering a case where the voltage switching circuit 6 is connected directly to the silver oxide batteries 4, the current consumption will be calculated as 24 hours $\times$ 10 $\mu A = 240$ $\mu A$ hour/day. This shortens the operating life of the batteries more particularly for use in extremely small current operating appliances such as electronic wristwatches. In the event the voltage switching circuit 6 is connected directly to the silver oxide batteries 4 in FIGS. 5 and 6, current flows at all times due to the leading edge and trailing edge characteristics.

Contrarily, according to the above given examples, the circuit operates only when the solar batteries enjoy incident light, and thus enables a 1/24 reduction of the current consumption.

Figure 7:
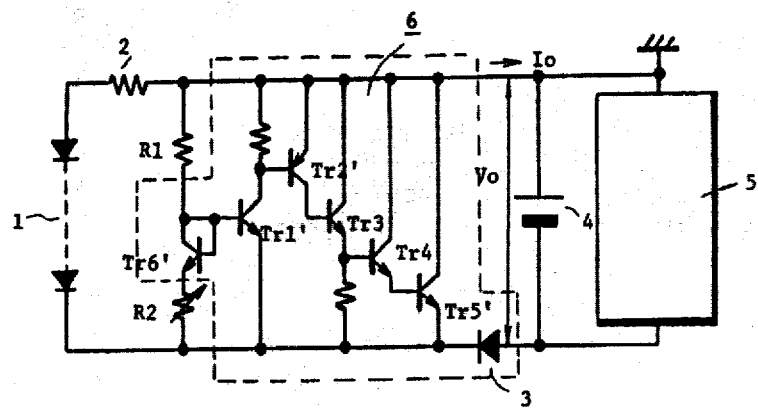
FIG. 7 is a circuit diagram showing another embodiment of the present invention.

FIG. 7 shows a modification in the voltage switching circuit 6 which is connected in parallel with a series circuit of the solar batteries 1 and the current limiting resistor 2. When using a Schottkey barrier diode as the reverse-current preventing diode 3, the forward voltage may be reduced in comparison with the conventional PN junction diodes. In other words, the utilization of the Schottkey barrier diode permits the charging process to complete with a relatively small photovoltage of the solar battery 1. The voltage switching circuit defined by the dotted line is implemented with semiconductor integrated circuit technology together with the reverse-current preventing diode 3.

The voltage switching circuit 6 includes a voltage detecting transistor $Tr_1'$, modified Darlington connected transistors $Tr_2'$ and $Tr_3'$ available for improving characteristics and Darlington connected switching transistors $Tr_4'$ and $Tr_5'$ and bias resistor $R_1$ and $R_2$ provided for the transistor $Tr_1'$, which is biased adjustably with the resistor $R_2$. A transistor $Tr_6'$ connected between the resistors $R_1$ and $R_2$ operates as a diode to improve the temperature characteristic of the voltage switching circuit in union with a base-to-emitter diode characteristic of the transistor $Tr_1'$.

Figure 8:
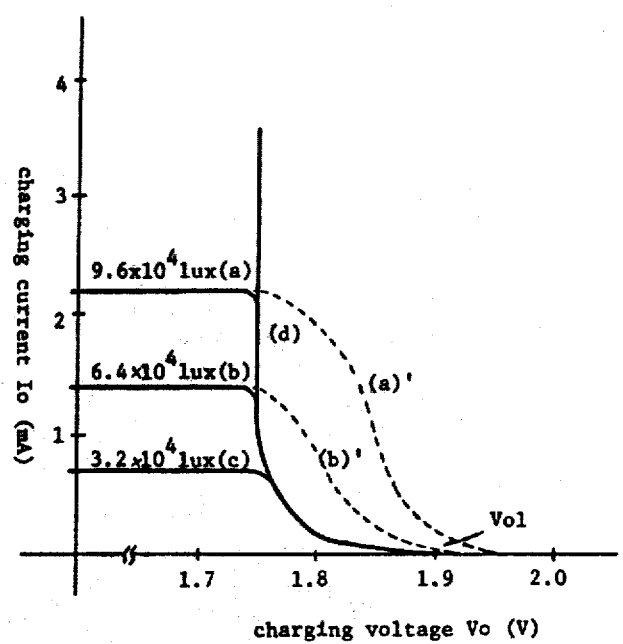
FIG. 8 is a characteristic curve showing relationship between charging voltage and charging circuit.

The relationship between the voltage Vo and the current Io of the charging assembly of FIG. 2 is plotted in FIG. 8. The charging process is advanced as shown by the curve (a) under $9.6 \times 10^4$ lux, the curve (b) under $6.4 \times 10^4$ lux and the curve (c) under $3.2 \times 10^4$ lux. However, it should be understood that the charging process is restricted under the fully-charged condition as shown by the curve (d). The curve (d) is determined by respective characteristics of the reverse-current diode 3 and the voltage switching circuit 6. In other words, the leading voltage $Vo_1$ on the curve (d) is equal to the switching voltage of the voltage switching circuit 6 minus the forward voltage of the reverse-current preventing diode 3. The characteristics shown in FIG. 8 are obtained with eight (8) serially connected solar batteries each having working surface area of 12 mm$^2$.

In case where the voltage-current characteristic (switching characteristic) of the switching circuit 6 is dull, or in case where an amount of incident light is varied within a wide range as compared with the voltage-current characteristics of the switching circuit, all the charging current Io will not be able to bias in other switching circuit 6 with the same voltage. This results in that the voltage Vo-current Io characteristics will vary for each of amounts of incident light as shown by the dotted lines (a)', (b)' in FIG. 8. When this occurs, the permissible range of the battery voltage-charging current is no longer expected at high intensity for example more than $9.6 \times 10^4$ lux.

The switching circuit 6 of FIG. 7 is adapted to exhibit a sharp switching characteristic. When the charging voltage Vo is increased, the voltage detecting transistor $Tr_1'$ and the characteristic improving transistors $Tr_2'$ and $Tr_3'$ are turned on. Within the last stage switching transistors $Tr_4'$ and $Tr_5'$; the Darlington connection increases the current gain and decreases the on resistor of the transistor $Tr_5'$. This makes the switching characteristic sharp together with operation of the characteristic improving transistors $Tr_2'$ and $Tr_3'$. Therefore, with such an arrangement, the characteristic is not varied upon variations in the amount of incident light so that the charging process is developed in accordance with the solid line characteristic without departing from the permissible range of the battery voltage-charging current shown in FIG. 1.

While only certain embodiments of the present invention have been described, it will be apparent to those skilled in the art that various changes and modifications may be made therein without departing from the spirit and scope of the invention as claimed.

What is claimed is:

1. A charging circuit including a solar battery and a silver oxide secondary battery, said charging circuit delivering a charging voltage and a charging current to said silver oxide secondary battery, comprising:
   voltage limiting means shunting said solar battery for limiting said charging voltage across said secondary battery to a predetermined value, said voltage limiting means including a PN junction diode means in series with a light-emitting diode means; and
   current limiting means in series with the combination of said solar battery and said voltage limiting means shunting said solar battery for limiting said charging current through said secondary battery.

2. The charging circuit as recited in claim 1, wherein the charging voltage limiting means and the charging current limiting means are enabled only when said solar battery is working.

3. The charging circuit as recited in claim 1, wherein said secondary battery comprises at least one sealed type silver oxide battery.

4. The charging circuit as recited in claim 1, wherein said secondary battery comprises one or more sealed type mercury batteries.

5. A charging circuit delivering a charging voltage and a charging current to a secondary battery means comprising:
   at least one solar battery;
   a current limiting means in series with said solar batteries for limiting said current to said secondary battery means;
   a reverse current preventing diode connected in series with said current limiting means;
   at least one sealed type silver oxide battery connected in parallel with said at least one solar battery via said series circuit of said reverse current preventing diode and said current limiting means, said at least one silver oxide battery serving as said secondary battery means for said at least one solar battery; and
   a voltage switching circuit means responsive to the voltage delivered from said solar battery for limiting the charging voltage from said solar battery to a predetermined value when charging said at least one silver oxide battery, said voltage switching circuit means including a PN junction diode means in series with a light emitting diode means.

6. A charging circuit delivering a charging current and a charging voltage to a secondary battery means, comprising:
   at least one solar battery having an output voltage;
   at least one sealed type silver oxide secondary battery means being charged with said output voltage of said at least one solar battery;
   a reverse-current preventing diode means connected between said at least one solar battery and said secondary battery means;
   current limiting means in series with said at least one solar battery for limiting the charging current to said secondary battery means; and
   a voltage switching circuit means for limiting said charging voltage across said secondary batteries to a predetermined value, said predetermined value of said charging voltage being variably adjustable by said voltage switching circuit means, said voltage switching circuit means comprising a voltage sensing transistor means, a characteristic improving transistor means responsive to said voltage sensing transistor means and switching transistor means responsive to said characteristic improving transistor means, said switching transistor means being connected in a Darlington connection thereby increasing the current gain associated with said charging circuit.

7. The charging circuit as recited in claim 6, wherein said voltage switching circuit is implemented by utilizing integrated circuit technology.

8. A method of charging at least one sealed type silver oxide secondary battery whose charging current and charging voltage is supplied from at least one solar battery, said at least one sealed type silver oxide secondary battery having a tendency to swell out after the full charged voltage and current condition is achieved, said method comprising the steps of:
   selecting a desired maximum magnitude of said charging voltage desired to be delivered from said at least one solar battery;
   limiting the charging voltage across said at least one silver oxide secondary battery to said desired maximum magnitude by utilizing a PN junction diode means in series with a light-emitting diode means; and
   limiting the charging current to said at least one silver oxide secondary battery, simultaneously with said limitation of said charging voltage across said at least one secondary battery.

9. The charging circuit as recited in claim 6, wherein said reverse-current preventing diode comprises a Schottkey barrier diode means.

10. A charging circuit for delivering a charging current and a charging voltage to a secondary battery means, comprising:

at least one solar battery having an output voltage;

switching means shunting said at least one solar battery for switching to an ON condition and an OFF condition in response to said output voltage delivered by said at least one solar battery, said switching means switching to said ON condition when said output voltage of said at least one solar battery exceeds a predetermined value, said switching means switching to said OFF condition when said output voltage from said at least one solar battery has a value below said predetermined value, said switching means providing an approximate short circuit across said at least one solar battery when said switching means is switched to said ON condition thereby placing a limit on said predetermined value of said output voltage from said solar battery in charging said secondary battery, said switching means including a PN junction diode means in series with a light-emitting diode means;

variable adjustment means connected across said at least one solar battery and to an input terminal of said switching means for variably adjusting the magnitude of said predetermined value of said output voltage from said at least one solar battery required to switch said switching means to said ON condition;

current limiting means in series with the parallel combination of said at least one solar battery, and said switching means, for limiting the flow of said charging current from said solar battery in charging said secondary battery means, said secondary battery being charged by said charging current passing through said current limiting means, said secondary battery comprising a silver oxide battery.

11. A charging circuit in accordance with claim 1 wherein said voltage limiting means further comprises variable adjustment means for variably adjusting the magnitude of said predetermined value.

* * * * *